Patented Sept. 12, 1933

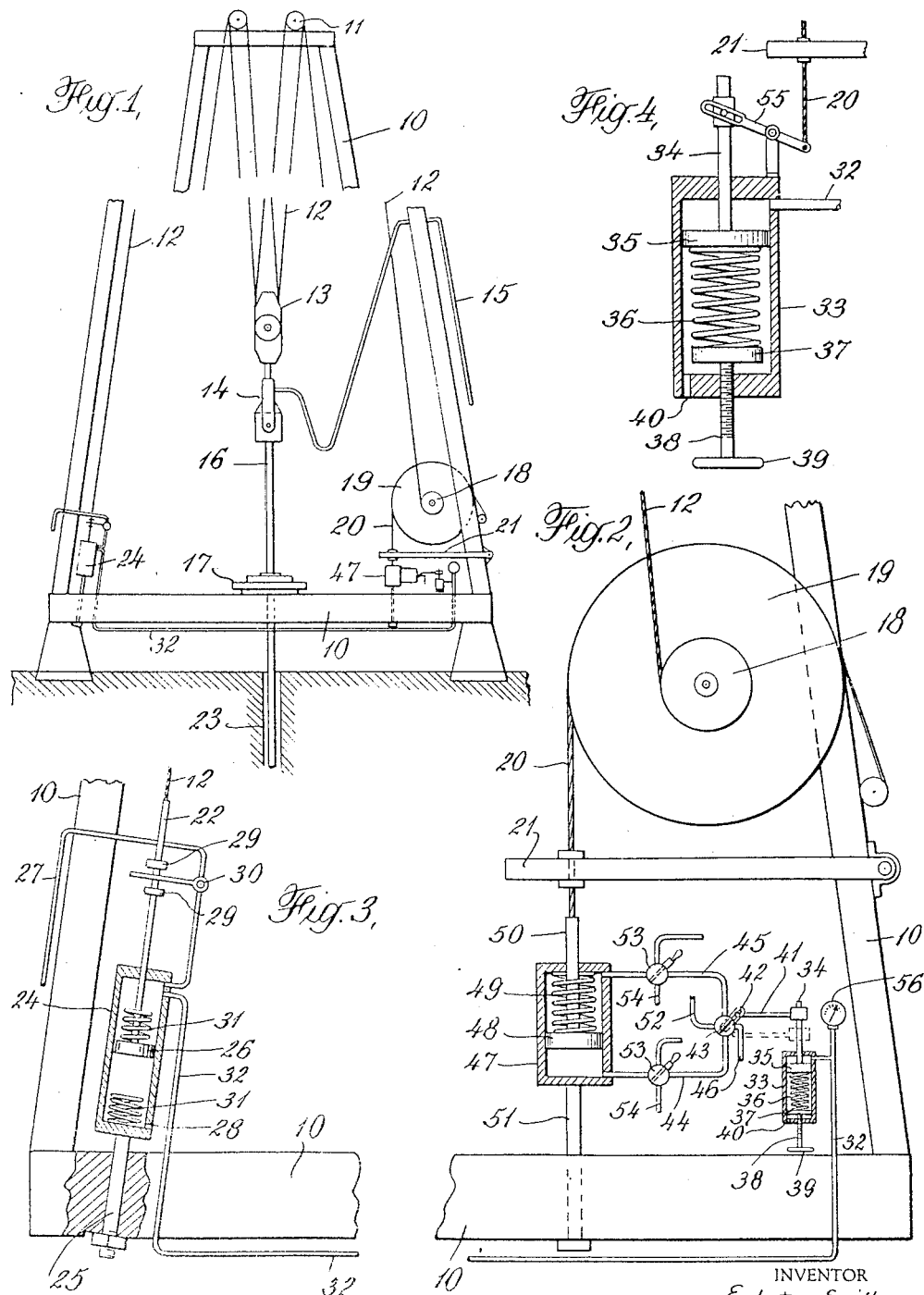

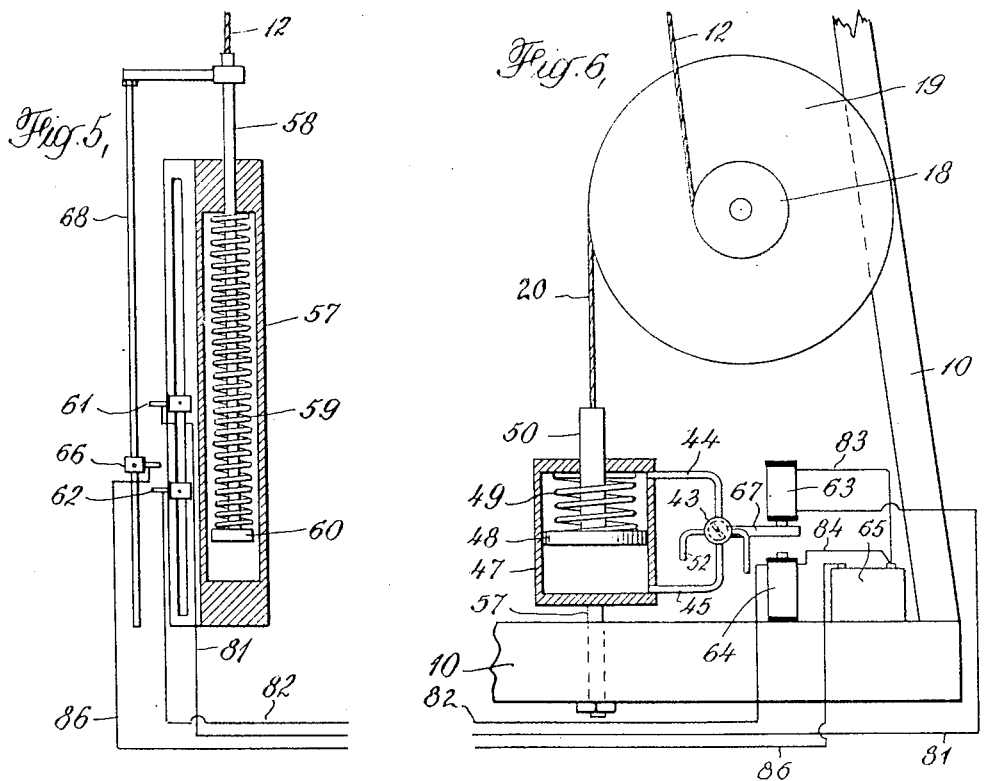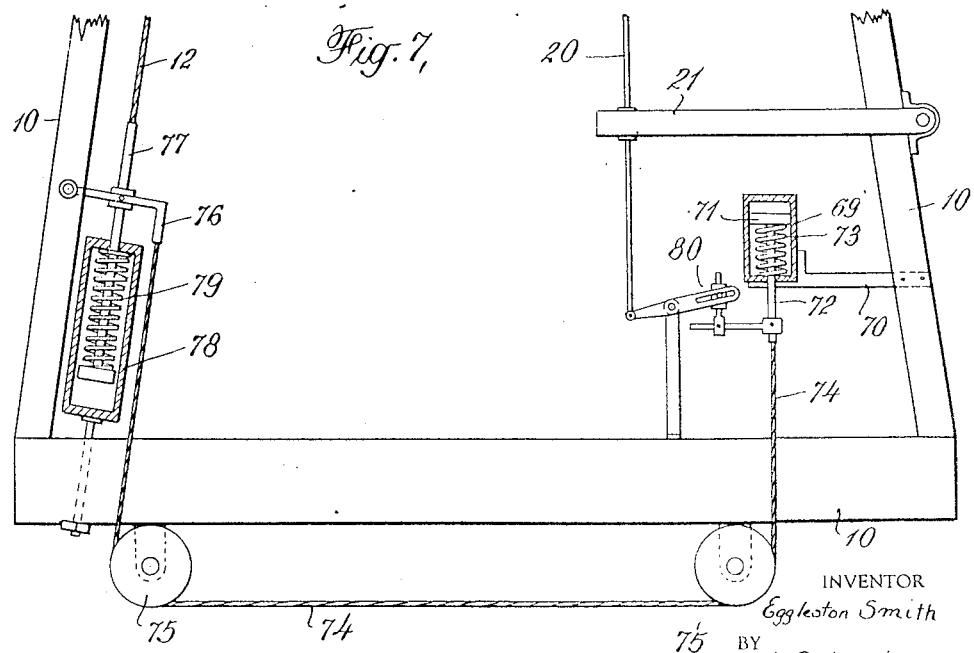

1,926,119

UNITED STATES PATENT OFFICE 1,926,119

FEEDING PRESSURE CONTROL FOR EARTH BORING APPARATUS

Eggleston Smith, Newark, N. J., assignor to Eggleston Drilling Corporation, Dover, Del., a corporation of Delaware Application October 19, 1927. Serial No. 227,156

7 Claims. (Cl. 255—19)

This invention relates to means for automatically controlling the feeding of rotary drills and more particularly for regulating the pressure on drilling tools in deep well drilling.

In deep well drilling, the weight of the drill pipe is very great and the rotary drill must be suspended from the surface. Rotary drilling rigs comprising a derrick, suitable pulleys, cables and a hoist are used for this purpose. As the drill pipe stretches to a certain extent under its own weight, pressure on the drilling tool may be supplied by allowing the drilling tool to carry a portion of the weight of the drill pipe. The desirable pressure for driving the drilling tool will vary under different conditions but in deep well drilling it will generally be equivalent only to a small portion of the total weight of the drill pipe.

As the drilling operation proceeds, the drill pipe must be lowered so that the drilling tool will continue to be under pressure. Heretofore, this feeding has been controlled by hand and as a result the pressure on the drilling tool was apt to vary between wide limits particularly when the drill cut through formations of varying resistance. Large variations in the pressure exerted on the drilling tool are extremely undesirable, for when the weight on the drill cutter is insufficient, the rate of drilling is low and when the weight on the drill tool increases materially the drill tool is subject to serious injury, and sometimes is destroyed under the increased pressure, thereby causing a prolonged halt in the drilling operations.

The present invention provides a device wherein the feeding of the drill pipe is automatically controlled so that the pressure on the drilling tool will vary only slightly and between well defined limits. These limits may be chosen within the most efficient pressure range for the drilling tool so that the rotary drill will operate in a more efficient manner than before. As the device automatically regulates the pressure exerted on the drilling tool, excessive pressures will be avoided thus prolonging the life of the drilling tool and eliminating any serious interruptions to the drilling operation through injuries to the drilling tool and the drill pipe.

The present invention also provides a device for automatically controlling the feed and the feeding pressure in a rotary drill which is of simple construction and which may be readily adapted to existing rotary drills.

For an example of apparatus embodying and adapted to carry out the invention reference is made to the accompanying drawings;

Fig. 1 is a rotary drilling rig equipped with hydraulic feed and pressure control;

Fig. 2 is an enlarged view of the right hand corner of Fig. 1 showing the hydraulic brake mechanism and the spring control cylinder;

Fig. 3 is an enlarged view of the lower left hand corner of Fig. 1 showing the hydraulic pressure cylinder;

Fig. 4 shows the spring control cylinder connected directly to the brake band;

Fig. 5 is a spring control cylinder with electric contacts;

Fig. 6 is the hydraulic brake mechanism controlled by magnetic coils, and

Fig. 7 is a mechanical modification of the invention showing the spring control cylinder connected directly with the supporting cable and a spring pressure cylinder.

Referring to Figures 1, 2 and 3, the rotary drilling rig comprises a derrick 10, the crown pulleys 11, the supporting or hoisting cable 12, the travelling block 13, the swivel 14, the drilling hose 15, the grief stem 16, with the usual drill pipe connected to its lower end, the rotary table 17, the hoist 18 on which one end of the supporting cable 12 is wound, the brake drum 19 and the brake band 20 which is connected to the hand brake lever 21.

These elements comprise the essential parts of the usual rotary drilling rig. One end of the supporting cable is wound on the hoist 18, as we have seen, and the other end of the cable, instead of being connected to the piston rod 22 as shown, is ordinarily secured directly to the floor of the derrick 10. In the derrick illustrated in Fig. 1 as there are four pulleys, the end of the cable 12 attached to the piston rod 22 will only carry ¼ of the weight. By increasing or decreasing the number of pulleys the cable 12 may be made to bear a smaller or larger portion of the total weight.

The feeding of the grief stem 16 and drill pipe may be manually controlled by the hand brake lever 21. By releasing the tension on the brake band 20, the cable 12 will unwind from the hoist 18 because of the weight of the drill pipe, and the drill pipe will be lowered into the hole 23 being drilled. As I have already explained, this method of manually controlling the feeding of the drill pipe not only results in inefficient operation but frequently in serious injury to the rotary equipment.

According to the present invention both the feeding of the drill pipe and the pressure on the drilling tool are automatically controlled.

Instead of fastening one end of the cable 12 to the floor of the derrick 10, the cable is attached to the piston rod 22. The hydraulic pressure cylinder 24 is held in a fixed position in any appropriate manner, e. g. by the rod 25 embedded in the floor of the derrick 10. The piston rod 22 coacts with the piston 26 within the cylinder 24. A hydraulic pressure supply line 27 opens into the cable end of the cylinder while the head end of the cylinder is provided with a drain 28. The piston rod 22 is provided with the stops 29 which operate valve 30 on the supply line 27 thus automatically maintaining the piston 26, which sustains the weight of the drill pipe 16 through the cable 12, in a central position in the cylinder 24. If the piston should rise slightly, the stops 29 will immediately open valve 30 which will be closed by the stops when the piston has resumed its central position.

During the drilling operation, as the proportion of the weight of the drill pipe carried by the cable 12 increases, the pressure in the cable end of the cylinder 24 will increase proportionately but the piston 26 will remain in a central position in the cylinder.

The springs 31 are provided as shock relievers in case there should be a sudden variation in pressure caused for instance, by sudden kicking of the drill pipe due to the inevitable torsional strain in a long drill pipe.

The cable end of the cylinder 24 communicates by means of the pipe 32 with one end, which we will call the pressure end, of a control cylinder 33. The control cylinder 33 is provided with a piston rod 34, a piston 35 which rides on a spring 36 which may be adjusted by means of the spring seat 37, the screw 38 and an adjusting wheel 39. The spring end of the control cylinder is provided with a drain 40.

A horizontal arm 41 is mounted on the piston rod 34 and the arm 41 has a sliding connection with a lever 42 of a four way valve 43 whereby the valve 43 is operated by the vertical motion of the piston rod 34. The four way valve is adapted to connect a second hydraulic pressure supply line 52 either to pipe 44 or pipe 45 and these same pipes to an outlet 46. These pipes 44 and 45 communicate with the ends of the cylinder 47. The cylinder 47 is provided with a piston 48, spring 49 and a piston rod 50 which actuates the brake band 20. The cylinder is held rigidly in position by means of a rod 51 which is embedded in the floor of the derrick 10.

We have already explained that as the proportion of the weight of the drill pipe carried by the cable 12 varies, the pressure in the cable end of the cylinder 24 varies. This variation in pressure will be transmitted to the pressure end of the control cylinder 33 through pipe 32. If the weight carried by cable 12 increases beyond the point desired, the pressure in the pressure end of the control cylinder 33 will be sufficient to depress the spring 36 thereby operating the four way valve 43 so that the inlet 52 will be connected with pipe 44 and the outlet 46 with pipe 45. The pressure in cylinder 47 will be such as to raise piston 48 thereby releasing the brake band 20 and allowing cable 12 to unwind from the hoist 18.

When the weight carried by cable 12 decreases to the desired point, the pressure in the pressure end of the control cylinder will decrease sufficiently so that the spring 36 will raise the piston 35 and operate the four way valve 43 in the reverse direction. The hydraulic pressure will now act on the upper face of the piston 48 and pipe 44 will be connected with the outlet 46 thereby causing the brake band 20 to grasp the drum 19 and stop the unwinding of the cable 12.

The three way valves 53 are supplied so that the brake may be operated independently of the control cylinder 33. The spring 49 acts to keep the brake set when the control system is not used and when the three way valves 53 are turned so that the ends of cylinder 47 drain through the outlets 54. The brake band may be released by lifting the hand brake lever 21.

The spring 49 acts also as a safety device for should the spring 36 of the control cylinder 33 fail, the piston 35 would be sufficiently depressed to manipulate the four way valve 43 so as to connect pipe 44 with the outlet 46. The pressure in the lower end of cylinder 47 being relieved, the spring 49 would immediately put on the brake.

As an example of the method of operation, let us suppose that the depth of the well being drilled is 8000 feet and that a 20 lb. per foot casing is being used for the drill pipe. The total weight of the drill will be 160,000 lbs. Let us suppose that the maximum weight the drilling tool can withstand is 10,000 lbs. and that its most efficient operating range, everything considered, is between 4,500 lbs. and 5,000 lbs. The derrick 10 then should always support at least 155,000 lbs. but never more than 155,500 lbs.

The drill pipe is lowered until the drilling tool just touches the bottom of the well. In this position the total weight of the drill is being supported by the derrick for the stretch of a pipe 8,000 feet long will be approximately 5 feet. The drill pipe is further lowered until the weight carried by the derrick is 155,000 lbs. This weight will be indicated by the pressure gauge 56 on pipe 32. The spring control cylinder is set by adjusting either the bar 41 on the piston rod 34, or the spring 36, so that the four way valve 43 will connect the inlet 52 with pipe 45, and the outlet 46 with pipe 44 thereby putting on the brake.

The drilling operation is started and as the well is drilled the pipe stretches and more and more weight is carried by the derrick. When this weight reaches 155,500 lbs. the spring 36 will be sufficiently depressed to actuate the four way valve and reverse the previous pipe connections. This will release the brake and permit the cable 12 to unwind from the hoist 18. As the weight carried by the derrick decreases the piston 35 will gradually rise and put on the brake when the weight carried by the derrick decreases to 155,000.

The drilling operation continues during this automatic adjustment of the pressure on the drilling tool.

A modification is shown in Fig. 4 in which the spring control cylinder 33 actuates, by means of a lever 55, the brake band 20. This arrangement is more simple, as the hydraulic brake mechanism is eliminated, but, of course, is less dependable than the arrangement shown in Fig. 2.

Another modification is shown in Figs. 5 and 6. In this arrangement, the spring control cylinder 57 replaces the hydraulic cylinder 24 shown in Fig. 3 on the left hand side of the derrick. The cable 12 is attached to piston rod 58. The spring 59 acts on the upper face of the piston 60 to which the piston rod 58 is connected. The cylinder 57 is provided with electric contacts 61 and 62 which are connected by wires 81 and 82 to the magnetic coils 63 and 64 respectively. The magnetic coils 63 and 64 are connected by the wires 83 and 84 to a source of electromotive force 65. The piston rod 58 is provided with an arm 68 carrying an electric contact 66 in such a manner that as the spring 59 contracts and expands under the variations in weight carried by cable 12 the electric contact 66 will make contact with either of the contacts 61 and 62 on the cylinder 57. The contact 66 on the arm 68 is connected by wire 86 with the source of electromotive force 65. The magnetic coils 63 and 64 operate the lever 67 of the four way valve 43 of the hydraulic brake mechanism which is identical with that shown in Fig. 2 except that the three way valves 53 have been eliminated for the sake of clearness. These three way valves may be inserted if desired. The contacts 61, 62 and 66 are arranged so that the brake will be set or released when any specific weight is being carried by the cable 12.

Instead of placing the cylinder 57 at the left hand side of the derrick and attaching the cable 12 to the piston rod 58, the cylinder 57 might be interposed between the pulley 13 and the swivel 14 shown in Fig. 1. In this new position the whole weight of the drill pipe would act on the spring 59 instead of a fraction of the weight.

The hydraulic cylinder 24 shown in Fig. 3 could, of course, also be interposed between the pulley 13 and the swivel 14 if desired.

A further modification is shown in Fig. 7 in which a spring control cylinder 69 is supported, in an inverted position by a member 70 extending from the derrick 10. The cylinder 69 is provided with the piston 71, the piston rod 72 and the spring 73. The piston rod 72 is actuated by the cable 74 which passes under the rollers 75 and is attached to the arm 76. The arm 76 is carried by the piston rod 77 of the cylinder 78. The cable 12 is connected to said piston rod.

When the tension on cable 12 increases, the spring 79 in cylinder 78 is contracted and the piston rod rises thereby contracting spring 73 of the control cylinder 69.

The piston rod 72 actuates through suitable linking means 80 the brake band 20 so that when spring 73 is contracted the brake is released and when the spring expands the brake is set. The linking means 80 as well as the arm 76 may be adjusted so that the brake will be operated when the desired weights are carried by the derrick.

Cylinder 78 might be dispensed with and cable 12 could pass under the pulleys 75 and be connected directly to piston rod 72 of the control cylinder 69. The cylinder 78 serves to decrease the strain on the control cylinder 69.

I claim:

1. The combination in a well drilling apparatus of a drill pipe, a lowering device for supporting a portion of the weight of the drill pipe, controlling means associated with said apparatus for controlling the feeding of the drill pipe, a hydraulic cylinder, a piston therein connected to said lowering device, a hydraulic pressure supply line connected to said cylinder, a valve on said supply line actuated by the movement of said piston so that variations in the weight carried by said lowering device cause variations of pressure in said cylinder without substantial displacement of said piston, and means responsive to the variations of pressure in said cylinder for regulating said controlling means.

2. In a device for automatically feeding and controlling the feeding pressure in rotary drills, a lowering device, a cable wound thereon, a brake for said lowering device, a fluid pressure cylinder for actuating said brake, ducts opening into the ends of said cylinder, and a valve actuated by means responsive to the variations in the weight carried by said cable for controlling the admission and release of fluid pressure to and from said cylinder.

3. In a device for automatically feeding and controlling the pressure in rotary drills, a lowering device, a cable wound thereon, a brake on said lowering device, a fluid pressure device for actuating said brake, a spring acting to apply said brake, and a valve actuated by means responsive to variations in the weight carried by said cable for controlling the admission and release of fluid pressure to and from said fluid pressure device, said valve being adapted to release the fluid pressure from said cylinder on failure of said weight-responsive means whereupon said spring will actuate said brake.

4. In a device for automatically controlling the feeding pressure in a well drilling apparatus, the combination of a lowering device having a cable wound thereon for supporting the drilling tool, a brake mechanism for controlling said lowering device, a fluid-pressure cylinder having a piston therein operatively connected with said brake mechanism to actuate the same, and a valve actuated by means responsive to variations in the weight carried by said cable for controlling the admission and release of fluid pressure to and from said cylinder.

5. A device of the character described including a drill stem, a reel, a cable on said reel supporting said drill stem, and a brake on said reel, the combination of a single means to positively operate said brake in either direction, and means responsive to tension on said cable to control said operating means.

6. A device of the character described including a drill stem, a reel, a cable on said reel supporting said drill stem, and a brake on said reel, the combination of fluid pressure means to positively operate said brake in either direction and means on said cable and acting responsive to tension on said cable to control the flow of pressure fluid to said operating means.

7. A device of the character described including a drill stem, a reel, a cable on said reel supporting said drill stem, and a brake on said reel, the combination of pressure fluid actuated means to operate said brake, means to supply pressure fluid to said operating means, and means responsive to tension on said cable to control the operation of said supply means.

EGGLESTON SMITH.